D. B. LEE.
METHOD OF FORMING SOLDERED SEAMED TUBING.
APPLICATION FILED MAR. 14, 1919. RENEWED FEB. 23, 1922.
1,424,170. Patented Aug. 1, 1922.
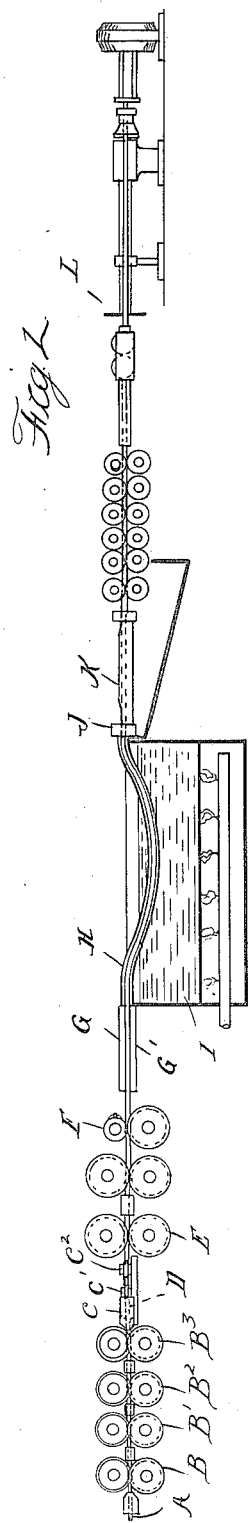
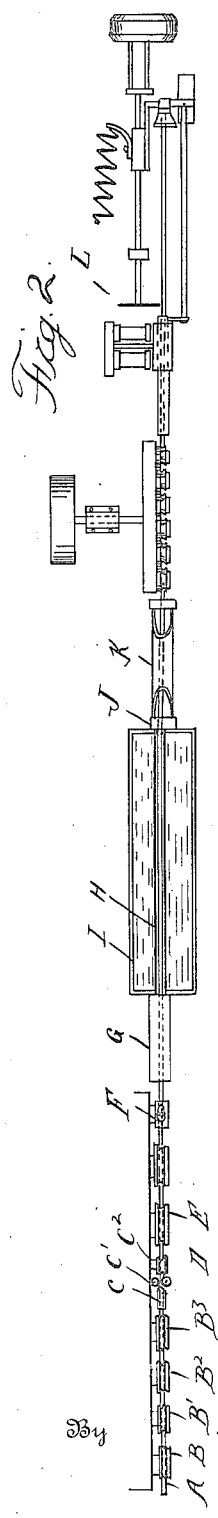
Inventor
Dwight B. Lee
By Whittemore Hulbert & Whittemore
Attorneys

UNITED STATES PATENT OFFICE.

DWIGHT B. LEE, OF DETROIT, MICHIGAN, ASSIGNOR TO MOTOR PRODUCTS CORPORATION, OF DETROIT, MICHIGAN, A CORPORATION OF MICHIGAN.

METHOD OF FORMING SOLDERED SEAMED TUBING.

1,424,170. Specification of Letters Patent. Patented Aug. 1, 1922.

Application filed March 14, 1919, Serial No. 282,594. Renewed February 23, 1922. Serial No. 538,796.

*To all whom it may concern:*

Be it known that I, DWIGHT B. LEE, a citizen of the United States of America, residing at Detroit, in the county of Wayne and State of Michigan, have invented certain new and useful Improvements in Methods of Forming Soldered Seamed Tubing, of which the following is a specification, reference being had therein to the accompanying drawings.

The invention relates to the manufacture of seamed tubing, such as is used in the construction of radiators and for other purposes, such tubing being formed of sheet-metal with a locked and soldered seam.

In the present state of the art tubing of this character has been formed by first forming up the tube from a flat strip or ribbon of sheet-metal, cutting the tube thus formed into short lengths and then soldering the seam by dipping in a solder bath. Many difficulties have been encountered in the manufacture by this method, first, in the mechanical formation of the tubing. This is usually formed of strips of copper or other soft metal, said strips being advanced through a series of dies which form the tube with a locked seamed joint. Very frequently these strips will jam and clog during advancement, resulting in the wasting of material and delay in the operation. Another difficulty is in handling the tubing after it is formed. The sheet-metal strips are of relatively long lengths, such as 500', but it is impossible to handle such long tubes in the subsequent operations. Consequently it is usual to cut the tubes as they leave the forming machine into lengths of 25' or thereabouts, this operation being performed by hand and requiring the constant attendance of a workman. The shorter lengths are then taken to the machine in which they are sawed to exact lengths for the radiators, and there is considerable waste in these operations. After being severed to the short lengths the seams must be soldered, and as this is performed by dipping in a solder bath, the tubes are coated both inside and out, which not only uses up solder, but also may obstruct the tube.

The central idea embodied in the present invention is the forming of the completed soldered seamed tube and the delivery of the same in finished lengths by one continuous operation. A further feature is the soldering of the seam by coating the outside only of the tube; thereby saving solder and preventing obstruction. A further important feature is the advancement of the tubing by power increments distributed throughout the entire length, so that the work of passing the strip through the forming dies is assisted by the draft of the advancing means for the tubing when further operated upon. The surface speed of the rolls for advancing the work is also progressively increased, so that all portions of the tubing are placed under tension, avoiding buckling or clogging.

In the drawings:

Figure 1 is a diagrammatic longitudinal section through a machine for carrying out the method;

Figure 2 is a plan view thereof.

My new method is preferably carried out in an apparatus which comprises tube forming mechanism, in which the metallic strip or ribbon is fashioned into a closed tube preferably having a locked seam. Beyond this forming mechanism is a soldering apparatus including means for depressing the tubing beneath the surface of the solder bath while continuing its advancement. Beyond the soldering apparatus is arranged a tube straightening means, and finally there is provided an automatic tube severing device by which the tubing is cut into predetermined lengths. Each of the several mechanisms is so constructed that the forward end of the strip or tubing may be pushed therethrough, being properly guided to avoid interference, while after passing completely through, all of the feeding rolls assist in its advancement. To avoid entrance of the molten solder into the tube, the forward end must be closed, and this is accomplished by closing mechanism located between the forming mechanism and the soldering bath.

As shown, A is a metallic strip or ribbon which is first advanced through a series of rolls B, B', B² and B³ which successively fashion it into a U-shaped cross-section with hooked edge portions. The strip is then advanced through the dies C, C' and C² which close the tube about a mandrel D engaging the hooked flanges with each other. While still on the mandrel the strip passes between grooved rolls E which complete the formation and close and lock the seam. The advancing end of the tube is then closed by pressing the upper and lower portions together and into a semi-circular cross-section of the same external diameter as the other portions of the tube, this operation being indicated at F. The tube then passes through a fluxing apparatus comprising the pads G and G' which are saturated with the flux. It then engages a tubular guide H which carries it downward in a curved path beneath the surface of molten solder in a soldering bath I, the tube H being perforated for admission of the solder. While passing through this bath the soldering of the seam is effected and upon leaving the bath the surplus solder is scraped off by a die J. The tube is cooled by a water spray K, after which it passes to the severing mechanism L. Here the tube is sawed into predetermined lengths which are ready for assembly in the radiator or other apparatus for which they are intended.

The construction of the apparatus by which the method is carried out forms no part of the present invention, and I have therefore omitted detailed description thereof.

What I claim as my invention is:—

1. The method of forming soldered seamed tubing, comprising the continuous advancement of a metallic strip and the successive forming of the strip into a tube and immersing of said tube in a solder bath during the continuous advancement thereof.

2. The method of forming soldered seamed tubing, comprising the continuous advancement of a metallic strip, the successive forming of the strip into a tube, closing the end of the tube and passing the tube through a solder bath.

3. The method of forming soldered seamed tubing, comprising the forming of a tube from a metallic strip, closing the forward end of the tube and passing the tube through a solder bath.

4. The method of forming soldered seamed tubing, comprising the continuous advancement of a metallic strip, forming said strip into a tube in one portion of its advancement, closing the forward end of the tube, passing the tube through a soldering apparatus and severing into predetermined lengths.

5. The method of forming soldered seamed tubing comprising the advancement of a metallic strip by power increments at different points in its advancement and performing successive operations including forming, closing, and immersing in a solder bath during the advancement and intermediate the points of said power increments.

6. The method of forming soldered seamed tubing of exactly predetermined lengths, comprising the continuous advancement of a metallic strip, and successively performing during such advancement the operations of forming, closing, soldering and severing.

7. The method of forming soldered seamed tubing, comprising the continuous advancement of a metallic strip, and performing successively during such advancement the operations of forming, closing, soldering, straightening and severing.

8. The method of forming soldered seamed tubing, comprising the advancement of a metallic strip, forming and closing said strip into a tube during such advancement, closing the forward end of the tube, passing the advancing tube through a soldering bath, straightening the soldered tube and severing to predetermined lengths.

9. The method of forming soldered seamed tubing comprising the continuous advancement of a metallic strip, forming said strip into a tube in one portion of its advancement, immersing the tube in a solder bath in another portion of its advancement, and severing the soldered tube into predetermined lengths in still another portion of its advancement.

10. The method of forming soldered lock-seam tubing comprising the advancement of a strip of indeterminate length and progressive forming of the strip into a lock-seam tube, and the soldering of the lock-seam thus formed during the advancement of the strip and tube.

11. The method of forming soldered lock-seam tubing comprising the advancement of a strip of indeterminate length, and the successive forming of the strip into a lock-seam tube, the soldering of the lock-seam thus formed and the severing of the soldered lock-seam tube into predetermined lengths during the advancement thereof.

12. The method of forming soldered lock-seam tubing comprising the advancement of a flat metallic strip of indeterminate length, and the successive forming of the strip into a lock-seam tube, the soldering of the lock seam thus formed, the straightening of the soldered lock-seam tube and the severing of the soldered lock-seam tube into predetermined lengths during the advancement thereof.

13. The method of forming soldered lock-seam tubing comprising the continuous advancement of a metallic strip of indeterminate length and the successive forming of the strip into a lock-seam tube, and immersing of the seam of the tube in a solder bath during the continuous advancement of the strip and tube.

14. The method of forming soldered lock seam tubing comprising the continuous advancement of a flat metallic strip and the successive forming of the strip into a lock seam tube, immersing of the seam of the tube in a solder bath during the continuous advancement of the strip and tube, and then straightening the soldered lock-seam tube during said advancement.

15. The method of forming soldered lock-seam tubing comprising the continuous advancement of a metallic strip of indeterminate length, and the successive forming of the strip into a lock seam tube and heating the lock-seam of the tube by solder during the continuous advancement of the strip and tube to a temperature such that the tube will retain sufficient solder to seal the seam.

16. The method of forming soldered lock-seam tubing comprising the advancement of a flat metallic strip and the successive forming of the strip into a lock-seam tube, sealing of the lock-seam of the tube and heating the seam with and applying solder thereto, and severing of the soldered lock-seam tube into predetermined lengths during the advancement thereof.

17. The method of forming soldered lock-seam tubing comprising the continuous advancement of a flat metallic strip and the successive forming of the strip into a lock-seam tube, soldering of the lock-seam of the tube by heating with and applying solder thereto, straightening of the soldered lock-seam tube and severing of the soldered lock-seam tube into predetermined lengths.

18. The method of forming soldered lock-seam tubing comprising the continuous advancement of a flat metallic strip and the successive forming of the strip into a lock-seam tube, soldering of the lock-seam thus formed, removing of the surplus solder and severing of the soldered-lock-seam tube during the continuous advancement thereof.

19. The method of forming soldered lock-seam tubing comprising the continuous advancement of a flat metallic strip of indeterminate length and the successive forming of the strip into a lock-seam tube, immersing of the tube in a solder bath, and removing the surplus solder during the continuous advancement of the strip and tube.

In testimony whereof I affix my signature.

DWIGHT B. LEE.